W. H. SNYDER.
PNEUMATIC TIRE.
APPLICATION FILED DEC. 23, 1907.
921,174.
Patented May 11, 1909.
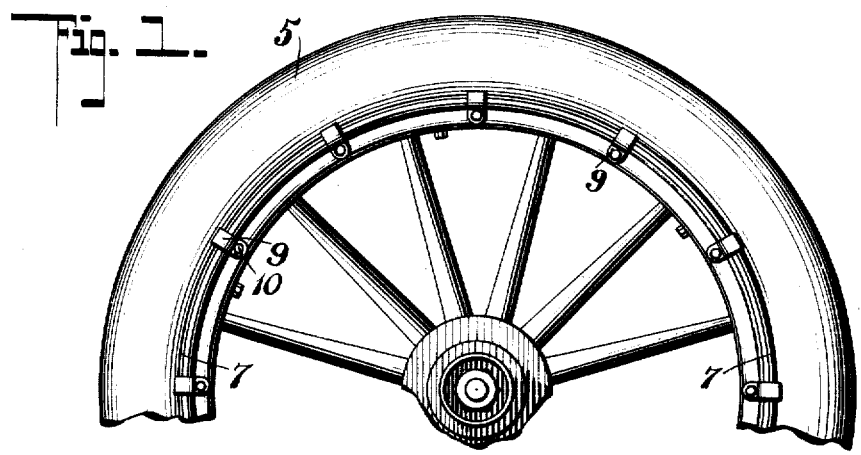
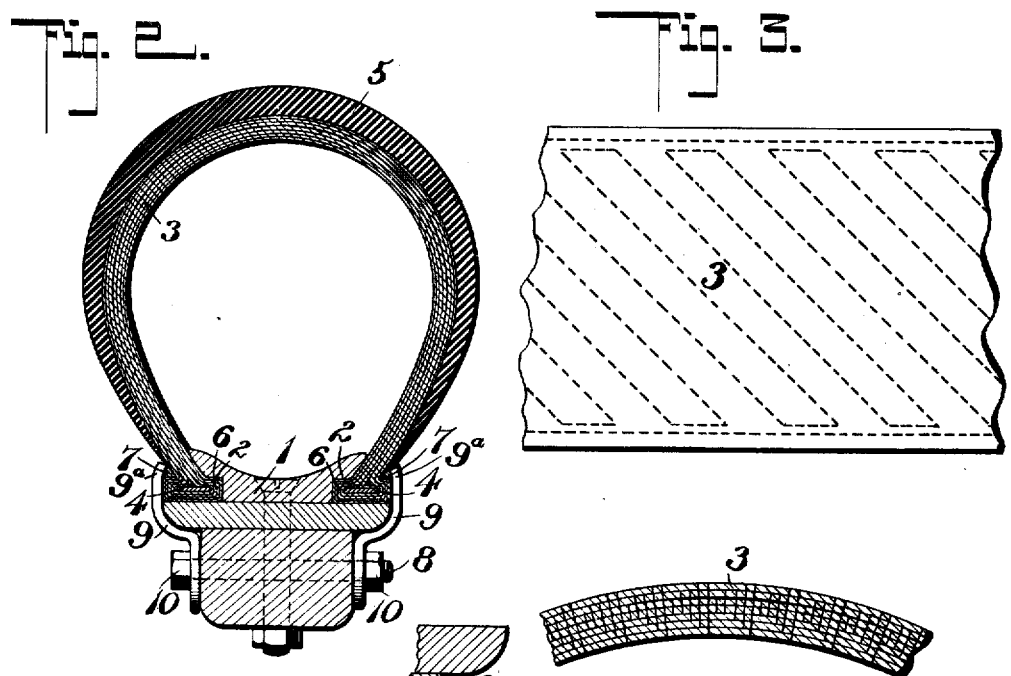
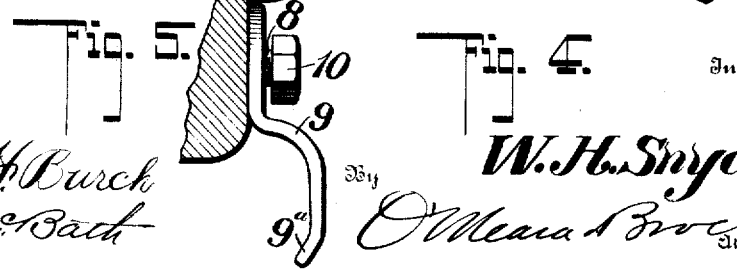
Witnesses
Philip H. Burch
E. B. McBath
Inventor
W. H. Snyder,
By O'Meara & Burch
Attorneys

UNITED STATES PATENT OFFICE.

WILLIAM H. SNYDER, OF KENTON, OHIO.

PNEUMATIC TIRE.

No. 921,174.  Specification of Letters Patent.  Patented May 11, 1909.

Application filed December 23, 1907. Serial No. 407,813.

*To all whom it may concern:*

Be it known that I, WILLIAM H. SNYDER, a citizen of the United States, residing at Kenton, in the county of Hardin and State of Ohio, have invented a new and useful Improvement in Pneumatic Tires, of which the following is a specification.

This invention relates to an automobile tire and means for locking the same securely upon the rim.

The object of the invention is a tire which will be very durable, and which can be easily repaired, thus adding to the life of the tire. It is common to employ canvas and rubber in such tires, the canvas being placed on in layers, and it is the usual custom to either cement the layers together or to build the tire up of alternate layers of canvas and rubber. In both of these common constructions the canvas layers become more or less separated during the summer as the travel of the wheels over hot pavements and roads heats the cement or rubber placed between the canvas layers, thus permitting the canvas to pull apart.

My invention consists of the novel features of construction hereinafter described, pointed out in the claims and shown in the accompanying drawings in which—

Figure 1 is a side elevation of a portion of a wheel showing my tire applied thereto. Fig. 2 is an enlarged transverse section through the tire and the wheel rim. Fig. 3 is a plan view of the canvas portion of the tire. Fig. 4 is a detail sectional view through a portion of the canvas tire. Fig. 5 is a detail sectional view showing a clencher in unlocking position.

In constructing the tire the same is applied to a rim carrying a ring 1 which is undercut as shown at 2 this undercut portion forming upon each side of the ring an annular groove. The tire is built up of canvas layers 3 and in constructing the tire 2 layers are stitched together and the stitches are run in a diagonal serpentine line. A third layer of canvas is then placed in position and is stitched in the same manner through the first two. A fourth layer is then applied and is stitched through the other three, and this operation is continued until the tire is of the required weight and thickness. In placing the strips of canvas in position they are cut double width and are placed over suitable longitudinally extending strips 4 which may be also of a stiff canvas. The two first layers stitched together will therefore be of one piece and the third and fourth layers would also be integral with each other, the third layer resting upon the outer face of one of the first two, and the fourth layer resting upon the outer face of the remaining layer of the two first, the strip of canvas from which the third and fourth layers are formed folding over and inclosing the selvage of the first two layers. This operation is repeated and in this manner a very stiff canvas tire is built up and one which it will be difficult to puncture. In case of a puncture a reinforcing canvas strip can be sewed over the puncture upon both the inside and outside of the tire. After the canvas tire has been completed a rubber fastening is vulcanized to it. When the tire has become worn the last layer of canvas can be removed and a new layer stitched on, revulcanized and the tire again made practically as good as new. It will be obvious that the strip 4 previously referred to produces upon the tire edges inwardly extending annular ribs 6, also formed of built up layers of canvas and these ribs fit into the grooves 2 formed in the ring member 1. This also forms a slight V-shaped recess along the outer face of the tire on each side into which are fitted clamping rings 7 wedge-shaped in cross section. To hold these rings in place bolts 8 are passed transversely through the felly and serve as pivot pins upon which turn steel spring clenchers 9 off set to curve around the rim and the free end portions of these clenchers are sprung inwardly, as is most clearly shown at 9ª in Fig. 5. Nuts 10 working on the bolts 8 force the clenchers tightly against the felly sides bringing the spring end portions of the clenchers into binding engagement with the rings 7 and as the nuts are tightened up and the clenchers forced closer to the felly they will partly straighten out, thus giving a strong constant spring pressure against the ring 7 and holding the tire very firmly in place so that all creeping is avoided.

To remove the tire it is only necessary to loosen the nuts and swing the clenchers downwardly into the position shown in Fig. 5, and the rings 7 can then be removed after which the tire can be lifted off without difficulty.

Having thus fully described my invention, what I claim as new and desire to secure by Letters Patent is:—

1. A tire of the kind described consisting of layers of canvas stitched together, all of the stitches passing through the first two layers, and the additional layers being stitched to the two first layers and to each preceding layer.

2. A canvas tire formed of a strip of canvas folded upon itself and stitched diagonally, a third layer stitched to the two first layers and in contact with the face of one of them, and a fourth layer stitched to the other three layers, in contact with the other of the first two layers, and integral with the third layer, the third and fourth layers covering and binding the edges of the two first.

3. An automobile tire formed of a plurality of canvas layers laid in contact with each other and stitched with a diagonal serpentine stitching said layers being added successively, and each being stitched to all of the preceding layers, and the rubber facing vulcanized to the outer face of the top layer.

4. An automobile tire formed of layers of canvas successively stitched together, longitudinal strips embedded in the tire edges, said strips forming inwardly projecting ribs, an undercut rim ring, said ribs fitting in the grooves formed by the undercutting, clamping rings and pivoted spring clenchers carried by the wheel felly and bearing upon said rings as and for the purpose set forth.

WILLIAM H. SNYDER

Witnesses:
H. E. PEARCE,
HUGH L. RUNKLE